United States Patent

[11] 3,590,871

| [72] | Inventor | Winston L. Shelton |
| --- | --- | --- |
| | | Jeffersontown, Ky. |
| [21] | Appl. No. | 824,431 |
| [22] | Filed | May 14, 1969 |
| [45] | Patented | July 6, 1971 |
| [73] | Assignee | Mles Filter Products, Incorporated |

[54] COMBINATION SAFETY AND MANUAL RELEASE VALVE
11 Claims, 6 Drawing Figs.

[52] U.S. Cl. ............................................. 137/624.12,
137/523, 137/612.1, 220/55
[51] Int. Cl. ................................................. F16k 31/48
[50] Field of Search ........................................ 137/495,
522, 506, 508, 624.12, 624.22, 523, 624.11, 630,
630.15; 220/55 PC; 44B

[56] References Cited
UNITED STATES PATENTS

| 54,682 | 5/1866 | Cameron | 137/522 |
| --- | --- | --- | --- |
| 724,888 | 4/1903 | Knox | 137/624.22 X |
| 927,706 | 7/1909 | Beardsley et al. | 137/624.12 |
| 1,494,487 | 5/1924 | Jacobs | 220/55 P.C. |
| 1,508,817 | 9/1924 | Pfaehler et al. | 220/44 B |
| 2,188,735 | 1/1940 | Grundstrom | 220/55 P.C. |
| 3,063,464 | 11/1962 | Binding | 137/624.12 |

Primary Examiner—M. Cary Nelson
Assistant Examiner—R. B. Rothman
Attorney—Mann, Brown, McWilliams and Bradway ABSTRACT: The disclosure relates to a relief valve arrangement for vessels operating under pressure including a weighted ball valve arrangement that opens when pressure exceeds a predetermined amount, or when actuated by a timer mechanism, a spring action valve that opens when pressure exceeds a higher predetermined amount, and a swing or rocker lever arrangement for manually opening the spring action valve to vent the pressure to atmosphere.

INVENTOR
WINSTON L. SHELTON

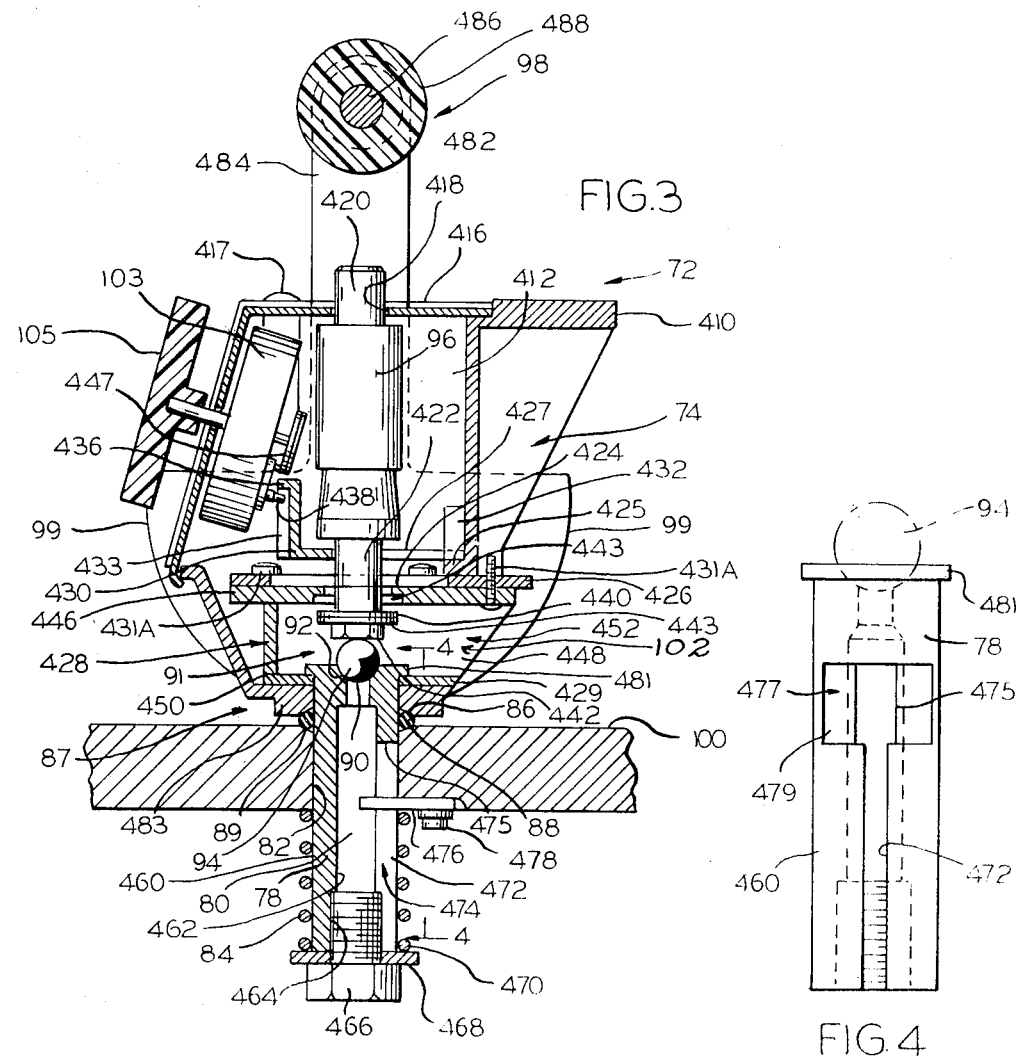
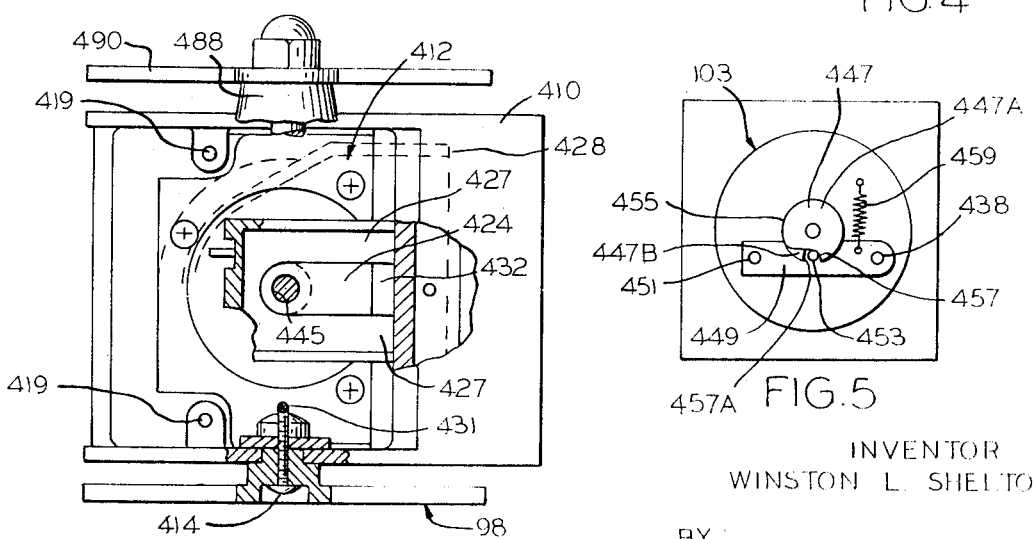

COMBINATION SAFETY AND MANUAL RELEASE VALVE

This invention relates to a combination safety and manual relief valve, and more particularly to a valve of the type especially suited for use in connection with pressure cookers and the like.

Relief valves are commonly used in connection with various types of pressure vessels, but conventional devices of this type have presented problems from the standpoint of long time reliability, consistent sensitiveness to operating conditions, and protection of the operator from escaping fluids under pressure. In the art of deep fat frying utilizing pressure cookers on a commercial basis, it is especially important that these problems be eliminated and that the valving arrangement be such that the overall operation of the cooker be reduced to the simplest operating procedure possible.

A principal object of this invention is to provide a combination safety and manual relief valve that avoids these problems and at the same time provides a valve device that is easily understood, and can be operated with facility by, the inexperienced help commonly encountered in the restaurant field.

Another important object of the invention is to provide a combination safety and manual relief valve of general application for use in connection with a wide variety of pressure vessels.

Still other objects of the invention are to provide a combination safety and manual relief valve that is composed of few and simple parts, that satisfies requisite safety requirements, that is economical of manufacture, convenient to install and long lived in use.

In accordance with this invention, there is provided a combination safety and manual relief valve comprising a housing formed with a timer chamber and carrying a stem member that projects therefrom which is tubular in nature and defines a valve seat at its inner end against which seats a ball element held in place by a weight that extends into the timer chamber for cooperation with a lifter element that is actuated by the timer mechanism to lift the weight off the ball for pressure relief purposes after a predetermined time set on the timer. The weight is secured to a flexible diaphragm which is connected to the weight and to the housing in sealing relationship with both so that the timer mechanism is protected from the fluids discharged through the valve. The weight is proportioned and related to the timer mechanism to permit the ball element to lift from its seat at a predetermined pressure in the chamber into which the stem extends. Operably associated with the stem and housing is an O-ring seal which is held in sealing relation between the stem and the vessel structure the stem is mounted in by spring means acting on the stem member, thus forming a spring action valve which is adapted to relieve pressure at the O-ring seal when internal pressures within the vessel exceed a predetermined maximum. Operably associated with the housing is a swing lever arrangement employing cam means that permits manual venting through the spring action valve at the O-ring seal.

Still other objects, uses, and advantages will be obvious or become apparent from a consideration of the following detailed description and the application drawings in which like reference numerals indicate like parts throughout the several views.

In the drawings:

FIG. 3 is a sectional view through the pressure regulator, but on an enlarged scale;

FIG. 4 is a detailed view along line 4—4 of FIG. 3;

FIG. 5 is a diagrammatic perspective view of the timer employed in the regulator; and FIG. 6 is a plan view of the regulator shown in FIG. 3, with its cover removed and parts being broken away to expose other parts.

Figure 1:
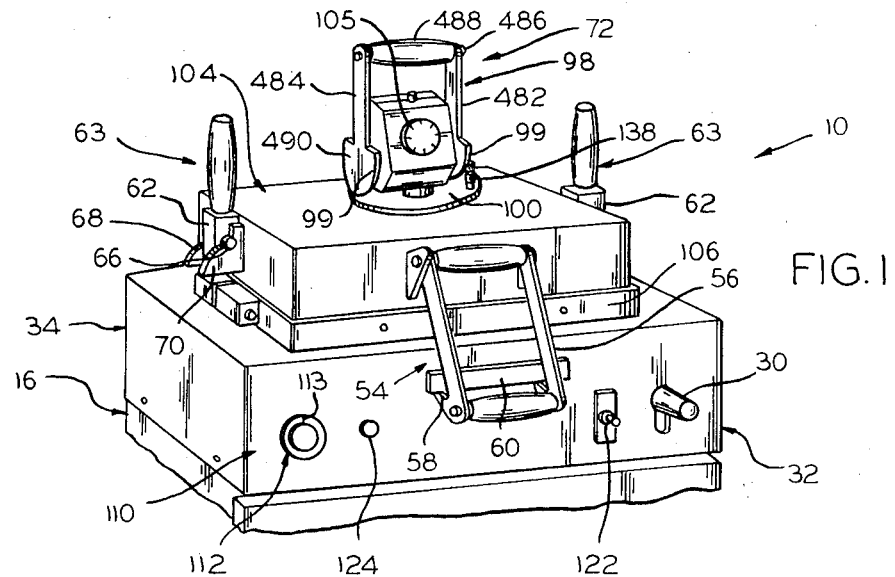
FIG. 1 is a perspective view of one embodiment of the invention applied to a deep fat fryer, showing same in condition for cooking under pressure.

However, it is to be understood that the specific drawing illustrations provided are supplied primarily to comply with the requirements of the Patent Code, and that the invention may have other specific embodiments that are intended to be covered by the appended claims.

GENERAL DESCRIPTION

Reference numeral 10 of FIGS. 1—5 generally indicates a deep fat fryer to which the invention has been commercially applied, fryer 10 generally comprising a vessel 12 (see FIG. 2) mounted in a suitable housing and supporting structure 14 that is incorporated in a suitable cabinet 16 which houses the vessel 12 and its associated components. The fryer 10 is fully disclosed in the application of Carl P. Mies and Winston L. Shelton, Ser. No. 824,430, filed May 14, 1969 (the disclosure of which is hereby incorporated herein in its entirety); while reference may be made to said application for a complete description of the fryer 10, sufficient descriptive matter pertaining to same is included herein to make clear the manner of operation of the regulator of this invention, which is indicated at 72.

The vessel 12 of fryer 10 is generally cylindrical in configuration and comprises a cylindrical sidewall 18 merging into a frustoconical bottom wall (not shown), which together define a smooth-walled cooling or frying compartment 22 that is free of any and all protuberances, recesses, and the like that could form a trap or lodge place for solids.

The bottom wall 20 of the vessel defines an outlet (not shown) for draining cooking oil therefrom, fluid flow through which is controlled by a valve device that is raised and lowered by a handle 30 at the front side 32 of the fryer 10 through an operating linkage (not shown) as distinguished from its rear side 34 (see FIG. 1).

The vessel 12 is heated by heater device (not shown), and chicken to be cooked is placed within the vessel 12 in a basket structure 38 that includes legs for supporting same on the bottom of the vessel 12 and a handle 39 for manipulating the basket, which handle 38 in accordance with this invention is arranged to have extensible and retractable end portions 41. Interposed between the basket 38 and the bottom wall 20 of the vessel 12 is a filter device (not shown) that rests on the vessel bottom wall 20 at its rim and engages the vessel bottom wall adjacent drain outlet through suitable legs and projections (not shown).

Pivotally connected to the housing structure 14 by the special hinge structure of said application (see reference numeral 48 of FIGS. 4, 9 and 10 thereof) is a cover 50 that includes about its rim 51 a seal 52 (see FIG. 2) proportioned for sealing engagement with the internal wall surface 21 of vessel 12 in the closed position of the cover 50. Associated with the cover 50 is a catch device 54 at the front 32 of the fryer 10 comprising a swing arm structure 56 formed with catch shoulders 58 to cooperated with a catch element 60 fixed to housing structure 14.

On either side of the cover 50 are cam locks 63 comprising holddown swing arms 62 pivotally connected as at 64 to the housing structure 14 and carrying rollers 66 for camming cooperation with cam surfaces 68 of the spaced flanges 70 that are formed on either side of the cover 50.

The cover 50 carries the novel pressure regulator unit 72 of this invention which controls the maximum pressure that can be generated within the vessel 12 during the frying operation.

The pressure regulator unit 72 (see FIGS. 3—6) generally comprises a valve body structure 74 mounted on a stem 78 that is formed with a central passage 80, and that is slidably mounted within opening 82 formed in the cover 50 such that compression spring 84 that biases the stem inwardly of the cover will seat annular seat 86 of valve body 74 against O-ring seal 88 that is received about stem 78, which seal 88 is in turn seated against annular seat 89 that is formed in cover 50 to form a relief valve 87. The passage 80 of stem 78 terminates in an outlet port 90 defining a seat 92 on which is positioned a ball member 94 that serves to close off port 90 under the bias of weight 96. Spring 84 is given a strength such that pressures on the order of 17 p.s.i. within vessel 12 (above atmospheric pressure) will move the stem 78 upwardly of FIG. 7 to expose the stem passage 80 to the atmosphere, while the weight 96 has a weight such that ball 94 will be lifted from its sealing relation with seat 92 when pressures within vessel 12 are on the order of 12 p.s.i. Stem seat 92, ball 90 and weight 96 form a valve device that is generally indicated at 91, which valve device is opened as part of the cooking process by a timer mechanism 103 that operates to lift weight 96 from ball 90 after predetermined time as set by manipulating its dial 105.

Regulator 72 includes swing or rocker arm device 98 that is pivotally connected to the valve body 74 and is provided with cam surfaces 99 forwardly and rearwardly of the regulator that are formed to cooperate with the top surface 100 of cover 50 to permit the operator to manually lift the stem 78 sufficiently to expose its passage 80 to the atmosphere for manually venting the vessel 12 through valve 87.

The valve body structure 74 is formed as indicated at 102 to direct all fluid pressure discharged from the vessel through the valve 91 rearwardly of the cabinet 16, and thus away from the position where the operator would normally stand.

Associated with the cover 50 is a splash shield structure 104 that is anchored to the cover by a yoke 106 and is formed to define at the rear of the cabinet 16 a discharge opening (see FIG. 4 of said application) from which fluids under pressure are discharged away from the operator in the event that seal 52 should fail or cam lock devices 63 were actuated to release the cover 50 prematurely.

Figure 2:
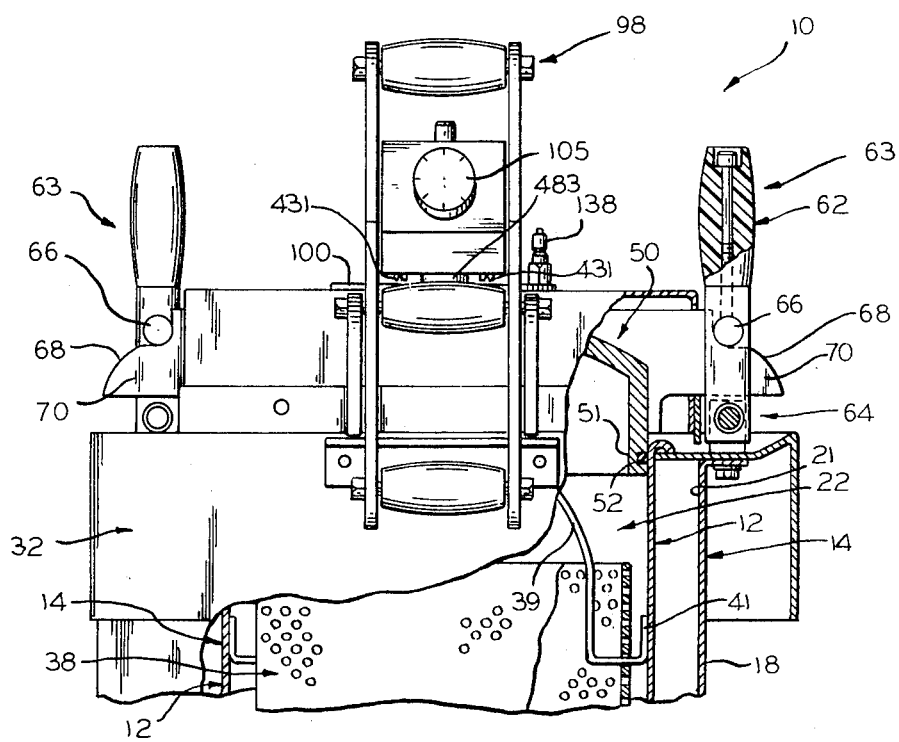
FIG. 2 is a front elevational view of the upper portion of the fryer and the pressure regulator of this invention, with parts being broken away to expose other parts.

The hinge structure includes a lost motion arrangement upwardly of the vessel 22 such that when the cam lock devices 63 are moved to their released positions, the cover will move from the level position of FIGS. 1 and 2 to an inclined position shown in said application in which the seal 52 at the rear of the vessel 12 is freed from sealing engagement with the wall surface 21 thereof, which permits fluids under pressure to escape rearwardly of the cabinet 16 under the guiding action of the splash shield 104. In the form shown, the cover at its rear end is biased upwardly by springs (see FIGS. 9 and 10 of said application) acting on its hinge pin.

The cabinet 16 in the embodiment illustrated includes an operating panel surface 110 that includes a thermostat control knob 112 cooperating with an indicator marking 113 that serves as an off-on switch and a means of controlling the amount of heat supplied by the heater for the fryer which is operably associated with a thermostat device, the control knob 112 being appropriately marked for indicating a moderate heat supply warmup position and a high heat supply cooling range position in accordance with the heat supply requirements that are indicated hereinafter.

The panel 110 also includes two-way off-on switch device 122 which is incorporated together with the thermostat control in a suitable electrical system to connect the fryer heater to a source of power in one position of switch 122 thereof, while shutting off the source of power in the opposed position there. Panel 110 also includes an indicator light indicated at 124 which is wired to light when the heater device is electrically actuated. The circuiting employed for heater device is made such, in any suitable manner, that when control knob 112 is moved from the "off" position, and switch 122 is in the "recover" position (see FIG. 5), the heater is energized, but is deenergized by the thermostat device operating a suitable switch (not shown) when the temperature of the fat reached about 375° F.; the control knob 112 when positioned in the "-warmup" position, on the other hand, insures that heater device will initially warm up the fryer at a lower heat-supplying rate and keep it warm until use is intended while its "-cooking" position effects full heat output of heater device. Operating handle 30 for operating the vessel drain valve also protrudes through the operating panel surface 110. The normal position for the operator to stand is in front of panel surface 110.

Cabinet 16 in the form shown is provided with a container (not shown) into which cooking oil from the vessel 12 is drained. As is made clear in said application, the cooking oil is drained under pressure through the filter unit in the vessel (see FIG. 16), and to achieve this end, cabinet 16 is provided with an air compressor unit of any suitable type that includes a suitable conduit provided with an end fitting of any suitable type adapted for securement to a fitting 138 applied to the vessel cover 50 through which air may be supplied under pressure to vessel 12 when the cooking oil is to be removed therefrom. The compressor is actuated by a suitable off-on switch readily accessible to the operator (not shown).

In accordance with the invention of said application, the vessel 12 and basket unit 38 are proportioned such that chicken, when divided into the customary cooking segments, is cooked in a suitable cooking oil or fat contained within chamber 22 in the ratio of 1 pound of chicken to about 2 pounds of cooking oil. In the specific embodiment illustrated, the vessel and basket unit are designed such that when the basket 12 is fully loaded, about ten pounds of chicken will be cooked in about 21 pounds of cooking oil, with the vessel being about 60 percent full when only the cooking is contained in same.

OPERATION

In operation, the operator charges vessel 12 with cooking oil in the usual manner, drain handle 30 having been proportioned (FIG. 1) to position the valve 26 in its closed position.

With the cover in its open position, the switch 122 is moved to its "recover" position, and control knob 112 is moved from the "off" position to the warm up position, which supplies sufficient heat to partially heat up the fryer and keep it warm until it is to be used. When use is desired, knob 112 is moved to the "cooking" position. The heater device heats up and supplies heat to the vessel 12 and through its wall 18 to heat up the oil until the temperature of the oil is approximately 375° F., whereupon the thermostat operates to shut off the heater, as will be indicated by the turning off of indicator lamp 124. The arrangement is preferably such that there will be sufficient heat radiating and being conducted from heater device so that the cooking oil will heat up to about 400° F.

Assuming that the swing arm device 98 of the regulator is positioned to close valve 87, and that a basket 38 has been loaded with the chicken to be cooked, the basket is grasped by grasping its handle 39 and is lowered into the vessel 12 (with its handle ends 41 retracted into the basket), to the position where its legs rest on the bottom of the vessel 21 with the cover remaining open; the chicken is then cooked for several minutes until it has a color similar to that of cornflakes, as can be determined by visual observation (as by temporarily removing one or two pieces for inspection purposes). The cover 50 is then swung to is initial closed position (the slanted dashed-line position of said application), wherein the cover 50 is sufficiently canted with respect to the vessel by the biasing action of the springs acting on the cover hinge pin, that the swing arm 56 of catch device 54 may be readily swung under the catch plate 60, after which the swing arms 62 are swung upwardly to cam the cover 50 into the fully closed position that is shown in FIGS. 2—4.

The hand operating dial 105 of timer mechanism 103 is set to allow about a 12-minute operating time before the timer mechanism operates to lift weight 96 off of ball 94 insofar as regulator 72 is concerned, to release the pressure buildup within vessel 12.

Thereafter, the cooking of the chicken proceeds, the moisture from the chicken parts creating steam pressure to place the vessel in the desired pressurized condition. As a result of the chicken and basket being put into the fryer, the temperature of the oil will quickly drop to about 300° F., but the residual heat in the heater and the vessel wall 22 is such that cooking proceeds through the browning and pressure cooking stages without having to supply more heat until the last few minutes of the cooking period set by operation of timer 103, which heat is supplied by thermostat device operating to automatically turn heater device on as needed. In practice, the temperature of the cooking oil drops down to about 250° F. during this cooking period.

After the time interval that has been set on the timer has elapsed, the pressure regulator 72 operates to release the pressure within the vessel through valve 91, the sound of which will alert the operator that it is now time to open the cover 50. The swing arm device 98 of the regulator is then operated (by swinging same toward or away from the operator) to manually open valve 87 by moving stem 78 of pressure regulator 72 (by camming either the forward or rearward set of cam surface 99 against cover surface 100) to release as much of the pressure as is reasonably practical from within the vessel, whereupon the swing arms 62 of cam locks 63 are swung away from each other to release the sides of the cover; thereupon the biasing springs of the cover hinge move the cover 50 to its inclined partially opened position to fully release excess pressure with vessel 12, whereupon the swing arm 56 of catch device 54 may be swung upwardly to release the front of the cover 50 for movement to the full open position. The handle 39 of basket 38 may then be grasped by the operator to lift the basket 38 upwardly sufficiently to dispose the retractable ends 41 of the handle 39 above the top of vessel 12, which permits them to spring outwardly so that they can serve to hold the basket 38 in the temporary position shown in FIG. 5, of said application which permits the oil to drain from the basket and the chicken contained therein.

After draining, the basket 38 may be removed to remove the chicken therefrom for refilling. During the chicken removal period, switch 122 and control knob 112 may remain in their "recover" and "cook" positions, respectively.

A new load of chicken parts may then be applied to and cooked in the fryer 10 in the manner indicated without draining off the cooking fat, the thermostat device automatically switching the heater device into connection with its power source to again heat the cooking oil up to 400° F., as before, and prior to application of the fresh chicken into vessel 12. When immediate chicken requirements have been supplied, knob 112 is moved to the "warmup" position to maintain the fryer at level of temperature suitable for ready return to full operation in the manner indicated. Movement of switch 122 and knob 112 to their "off" positions shuts down the fryer.

The arrangement of the fryer of said application is such that a number of batches of chicken may be consecutively cooked in the same cooking oil without changing the cooking oil, and even when this is done, the oil is merely filtered and then returned to the vessel with sufficient makeup oil to restore the original volume to the chicken versus cooking oil ratio that has been previously indicated.

Experience has shown that ordinarily six batches can be safely cooked in the same cooking oil using the herein disclosed invention, in terms of providing a high-quality product that is free of digestive problems. After the six batches of chicken, or when the operator by inspection observes that the cooking oil should be filtered, the knob 112 is moved to the "off" position, the cover 50 is clamped in its fully closed position, valve 87 is closed, the timer mechanism is reset, if necessary, to zero (to make valve 91 of regulator 72 operative), tee compressor is connected to fitting 138 and the switch controlling same is actuated to turn on the compressor motor, and air under pressure is supplied to the sealed-off vessel 12 up to the point where it starts escaping through regulator 72. The operator then operates handle 30 to opening the vessel drain valve (by moving same downwardly), thereby permitting the pressure within vessel 112 to force the cooking oil therein through the filter unit in the vessel and out through the vessel port or drain opening and into a container positioned below same. The filtering of the oil through filter unit under the high-pressure conditions indicated effects a drying of the solids collecting on top of the filter unit, which makes for ready and easy removal of same from the fryer by applying the hooked end of a suitable implement to the handle of the filter device to remove the filtered-out solids and filter unit as a whole from the vessel 12.

The filter unit may now be cleaned off and replaced within the vessel 12 to its normal operating position, whereupon the filtered cooking fat may be returned to the vessel and supplemented by new cooking fat up to the original volume indicated. The cooking of the next six or so chicken batches may proceed in the manner previously indicated, whereupon the cooking oil is again filtered and replenished for cooking of a like number of chicken batches. This may proceed, using essentially the same cooking oil charge as replenished, until it becomes apparent from appearance that the cooking oil has reached breakdown point that cannot be sufficiently diluted by the addition of makeup shortening.

SPECIFIC DESCRIPTION OF PRESSURE REGULATOR

The pressure regulator device 72 serves the important functions of limiting pressure buildup within the vessel 12, providing a timing arrangement for release of cooking pressures at the end of a predetermined cooking time that may be set by the operator, and providing for manual release of pressures within the vessel immediately prior to the operator opening the vessel cover 50.

In addition to providing these functions, the pressure regulator is shaped to direct rearwardly of the operator's normal operating position at the front of the fryer, fluids under pressure that escape from within the vessel through valve 91.

The pressure regulator body 74 (see FIGS. 3—6) generally comprises a housing 410 in which weight 96 is mounted in a timer compartment 412 thereof, with the swing arm device 98 being pivotally secured thereto by appropriate mounting screws 414 (see FIG. 6). The compartment 412 is closed by suitable cover structure 416 (held in place by suitable screws 417 applied to housing holes 419) that is formed to define a suitable opening 418 through which the upper end 420 of the weight 96 extends. The lower end 422 of weight 96 engages a diaphragm 424 which is interposed between a diaphragm plate 426 secured to the housing and a partition structure 428 that is mounted within the housing 410 about the valve 91 and rests on a support plate 429, the partition structure 428 and support plate being secured to the housing by suitable screws 431 (see FIG. 6) and the diaphragm plate being secured to partition structure 428 by suitable screws 431A.

The lower end 422 of the weight 96 also passes between the legs 427 of a forked lifter element 430, which legs 427 are disposed on either side of a projection 432 formed in housing 410 and rest on ledge 425 of housing 410. The lifter element 430 at its rear side is recessed as at 433 to define a ledge 436 that is engaged by the stud 438 of conventional timer mechanism 103 when the latter is actuated by its own internal mechanism to lift the valve weight 96 upwardly of ball 94, the ledge 425 serving as a fulcrum for element 430.

The weight 96 at its lower end carries flanged spacer 440 secured to weight 96 by an appropriate bolt 442 cooperating with lockwasher 443. The bolt 442 passes through opening 445 formed in diaphragm 424, the rim of diaphragm opening 445 being clamped between the lower end 422 of weight 96 and spacer 440. Bolt 442 rests on ball 94 of valve 91. Diaphragm 424 is in the form of a neoprene coated nylon fabric material on the order of 0.012-inch thick.

The timer mechanism 103 effects rotation of its disc 447 in a conventional manner, stud 438 being mounted on lever 449 (see FIG. 5), pivoted on the timer mechanism as at 451 and carrying pin 453 that rides on rim 455 of disc 447 and slips in slot 457 thereof under the action of tension spring 459 which acts to swing lever 449 to in turn swing element 430 upwardly and thus weight 96 as well at the end of the timing cycle. Disc 447 is in practice a composite disc structure comprising an outwardly facing disc 447A overlying a disc 447B that is slotted as at 457A to receive pin 453, disc 447B being suitable mounted for limited pivotal movement relative to disc 447A such that one side or the other of its slot 457A is aligned with the slot 457 in all possible positions thereof to receive pin 453 for quick actuation of valve 91 to open same at the end of the timer cycle.

The partition structure 428 comprises a top wall 446, spaced identical sidewalls 448 (only one of which is shown) on either side of the valve 91 that merge into a rounded forward wall 450 which faces the front side of the fryer when the regulator 72 is in its operative position on cover 50. The rear of the partition structure 428 is open as at 452 to direct fluids under pressure from valve 91 rearwardly of the fryer. Thus, the partition structure is received within housing 410 and defines a baffle arrangement that directs released fluids under pressure rearwardly. All cracks and openings between housing 410 and the partition structure are sealed by application of a suitable sealing compound.

Stem 78 of regulator 72 comprises a suitable tubular element 460 formed to define a bore 462 which forms passageway 80. Bore 462 is internally threaded as at 464 to receive bolt 466 that supports washer 468 which forms a spring seat for the end 470 of compression spring 84.

The sidewall of the stem 78 is slotted as at 472 to define an inlet port 474 leading to the passage 80 of stem 78 from the inner side of the cover 50. When the pressures under the cover 50 and within the vessel 12 are such that spring 84 is deflected to the point where the end 475 of slot 472 is disposed above O-ring seal 88, the slot end 475 forms a discharge port 477 whereby the internal pressures within the vessel are released through valve 87.

As indicated in FIG. 4, stem 78 is recessed across its slot 472, as indicated at 479, to better define the port 477.

Received within the slot 472 of the stem 78 below the recess 479 is a stop element 476 that is fixed to the cover 50 by a suitable screw 478. Stop element 476 is proportioned to substantially complement the width of slot 472 and is received within the locating recess 480 of cover 50. Element 476 maintains the stem 88 and the regulator 72 from rotating with respect to the cover 50, and serves as a stop limiting movement of the stem 78 outwardly of cover 50. Stem 78 adjacent its seat 92 is flanged as at 481 so as to engage against support plate 429, through which it extends, to resist the action of spring 84. The portion of housing 410 stem 78 extends through is formed to define a hub portion 483 to better define seal seat 96.

The rocker arm device 98 comprises a pair of arm members 482 having their ends 484 joined by suitable bolt 486 carrying handle 488. The ends 490 of the respective arms 482 are given the generally arcuate configuration indicated to define the cam surfaces 99 on either side thereof.

While the regulator 72 has been disclosed in connection with the specific fryer 10, it is apparent that it may readily be applied to other types of pressure cookers, or for that matter, any pressure vessel arrangement in which the safety, timing and manual control functions of regulator 72 are desired.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A pressure regulator for limiting pressure buildup in a pressure chamber,
said regulator comprising:
a stem member adapted to protrude through a wall of the chamber and being formed to define a fluids conducting passage extending between the interior and exterior sides of the chamber wall and defining an intake port for positioning at the interior side of the wall and a discharge port for positioning at the exterior side of the wall,
said stem member being formed to define a valve seat in circumambient relation with said discharge port,
a ball positioned to seat on said seat in sealing relation to said discharge port,
a weight positioned to seat on said ball,
means for guiding said weight for limited movement toward and away from said ball,
said seat, said ball and said weight being oriented so that in the operating position of said regulator, said ball rests on said seat and said weight rests on said ball to provide valve means for limiting pressure buildup in the chamber,
means for mounting said stem member in the wall for movement longitudinally thereof,
seal means in circumambient relation about said stem member,
and means for resiliently biasing said regulator into sealing relation with said seal means,
said stem member passage being formed to define a second fluids discharge port that moves out of sealing relation with said seal means on a predetermined pressure being generated in the chamber.

2. The regulator set forth in claim 1 wherein:
said regulator includes cam means operably connected to said regulator stem member for mechanically moving said regulator out of sealing relation with said sealing means to expose the second-mentioned fluids discharge port against the action of said resilient means.

3. The regulator set forth in claim 1 wherein:
said regulator includes baffle means directing fluids under pressure escaping from said discharge ports in a predetermined direction.

4. A pressure regulator for limiting pressure buildup in a pressure chamber,
said regulator comprising:
a stem member adapted to protrude through a wall of the chamber and being formed to define a fluids conducting passage extending between the interior and exterior sides of the chamber wall and defining an intake port for positioning at the interior side of the wall and a discharge port for positioning at the exterior side of the wall,
said stem member being formed to define a valve seat in circumambient relation with said discharge port,
a ball positioned to seat on said seat in sealing relation to said discharge port,
a weight positioned to seat on said ball,
means for guiding said weight for limited movement toward and away from said ball,
said seat, said ball and said weight being oriented so that in the operating position of said regulator, said ball rests on said seat and said weight rests on said ball to provide valve means for limiting pressure buildup in the chamber,
means including timer controlled means for lifting said weight from said ball after a predetermined time to permit fluids under pressure to escape from the chamber through said passage,
means for mounting said stem member in the wall for movement longitudinally thereof,
seal means in circumambient relation about said stem member,
and means for resiliently biasing said regulator into sealing relation with said seal means,
said stem member passage being formed to define a second fluids discharge port that moves out of sealing relation with said seal means on a predetermined pressure being generated in the chamber.

5. The regulator set forth in claim 4 wherein:
said regulator includes cam means operably connected to said regulator stem member for mechanically moving said regulator out of sealing relation with said sealing means to expose the second-mentioned fluids discharge port against the action of said resilient means.

6. In a pressure regulator for application to covers of pressure cookers to limit pressure buildup in the pressure chamber thereof,
said regulator comprising:

a housing, a stem member adapted to protrude through the cover and being formed to define a fluids conducting passage extending between the interior and exterior sides of the cover and defining an intake port for positioned at the interior side of the cover and a discharge port for positioning at the exterior side of the cover, said stem member being formed to define a valve seat in circumambient relation with said discharge port, said stem member being mounted in said housing to dispose said discharge port within said housing, a ball positioned to seat on said seat and within said housing in sealing relation to said discharge port, a weight positioned within said housing to seat on said ball, means for guiding said weight for limited movement toward and away from said ball, said seat, said ball and said weight being oriented so that in the closed position of the cover, said ball rests on said seat and said weight rests on said ball to provide valve means for limiting pressure buildup in said chamber, and means including timer-controlled means mounted within said housing for lifting said weight from said ball after a predetermined time to permit fluids under pressure to escape from the vessel chamber through said passage, said housing being formed to vent fluids under pressure escaping from said discharge port.

7. The regulator set forth in claim 6 wherein:

said regulator housing includes baffle means directing fluids under pressure escaping from said discharge port in a predetermined direction.

8. The regulator set forth in claim 6 including:

means for mounting said stem member in the cover for movement longitudinally of said stem member, and further including:

seal means in circumambient relation about said stem member, means for resiliently biasing said regulator housing into sealing relation with said seal means, said stem member passage being formed to define a second fluids discharge port that moves out of sealing relation with said seal means on a predetermined pressure being generated in the chamber.

9. The regulator set forth in claim 8 wherein:

said regulator includes cam means operably connected to said housing for cooperation with the cover to mechanically move said regulator out of sealing relation with said sealing means to vent the second mentioned fluids discharge port against the action of said resilient means.

10. The regulator set forth in claim 6 including:

a flexible diaphragm secured to said weight between said ball and said timer controlled means, and means for securing said diaphragm to said housing for sealing said timer-controlled means from fluids escaping from said discharge port.

11. The regulator set forth in claim 10 wherein:

said weight is free to permit pressures within the pressure chamber exceeding a predetermined amount to lift said ball against the biasing action of said weight to vent the chamber through said discharge port.